Patented Apr. 1, 1952

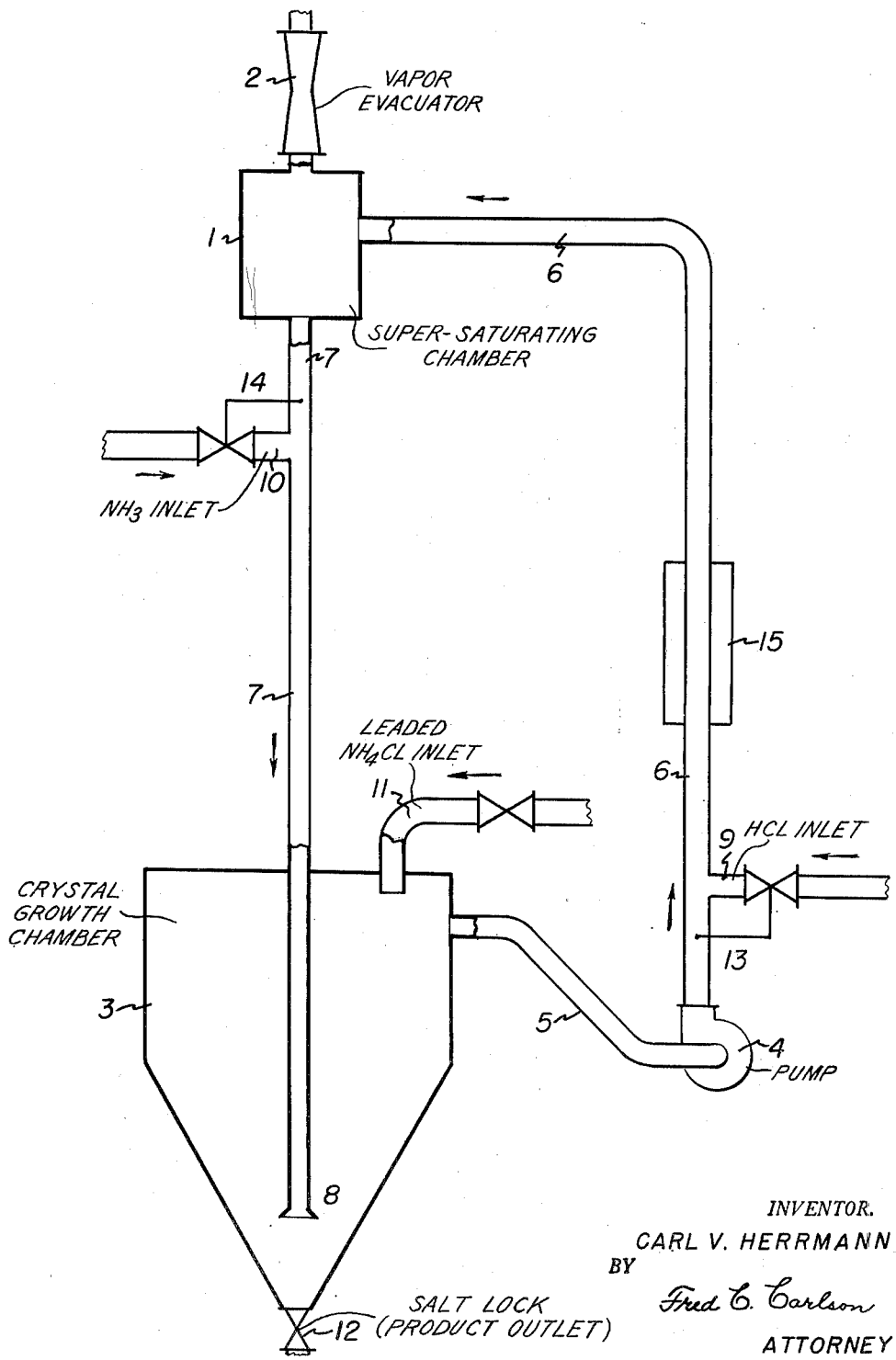

2,591,067

UNITED STATES PATENT OFFICE 2,591,067

CHEMICAL PROCESS FOR PRODUCTION OF LEADED AMMONIUM CHLORIDE CRYSTALS

Carl V. Herrmann, Highland, Ind., assignor to E. I. du Pont de Nemours & Company, Wilmington, Del., a corporation of Delaware Application March 16, 1948, Serial No. 15,134

1 Claim. (Cl. 23—100)

This invention relates to processes and apparatus for the manufacture of hard, dense leaded ammonium chloride crystals and to the crystals produced and is more particularly directed to continuous processes in which an aqueous, ammoniacal solution substantially saturated with ammonium chloride is acidified with hydrogen chloride to a pH of about from 5 to 7, water is evaporated under vacuum from the solution in a vaporization zone until the solution is super-saturated with ammonium chloride, ammonia is added to the solution until it is ammoniacal while it is flowing from said vaporization zone to a crystallizing zone, leaded ammonium chloride crystals are crystallized from the solution in said crystallization zone, the crystals are separated gravitationally from the mother liquor, lead chloride, ammonia, and hydrogen chloride are added to the separated mother liquor, and the so-fortified mother liquor is recirculated to the initial step of the process; is further directed to apparatus for carrying out such processes in which there is a closed super-saturating chamber connected to a vapor evacuator, a crystal growth chamber open to the atmosphere, a pump for circulating an ammonium chloride solution, conduits for the solution to pass from near the top of the crystal growth chamber to the pump and from the pump to the super-saturating chamber, a conduit for the solution to pass from the super-saturating chamber to the crystal growth chamber terminating at a point substantially below the level of the conduit from the crystal growth chamber to the pump, the super-saturating chamber being arranged at a considerable height above the crystal growth chamber, an inlet for adding a reactant to the conduit between the crystal growth chamber and the super-saturating chamber, an inlet for adding a reactant to the conduit between the super-saturating chamber and the crystal growth chamber, and an inlet for adding a feed liquor near the top of the crystal growth chamber, and is still further directed to the thus-produced hard, dense leaded ammonium chloride crystals in the form of substantially regular polyhedrons having more than twenty facets, a majority of the facets being quadrilaterals. In a preferred embodiment, the apparatus may also include control means on the reactant inlets responsive to the pH of solution in the conduits into which said inlets discharge, and a heater on the conduit between the pump and the super-saturating chamber.

The present invention provides a method and apparatus for making novel leaded ammonium chloride crystals continuously, whereas the only practicable methods heretofore proposed for producing this well known commodity have been batchwise operations. Since the product is produced continuously the method permits a high rate of production with a minimum of manual labor and equipment. By contrast, in batchwise operations the mother liquor is customarily allowed to cool in large tanks and the crystals which form are shoveled out manually. The cost of repairs and maintenance on such tanks is unduly high, the amount of solution and product in process at any particular moment is enormously large, and these two conditions result in yield losses. In the processes of the present invention a single crystallizing tank is used, the amount of product in process is a minimum, and yield losses are negligible.

The drawing illustrates an embodiment of this invention in which a closed super-saturating chamber 1 is connected to a vapor evacuator 2. The chamber 1 may be a flash evaporator such as commonly used for vaporizing water from hot solutions by the sudden application of vacuum. The vapor evacuator 2 may be a steam ejector vacuum pump. A crystal growth chamber 3, preferably with conical bottom, is located some distance below the super-saturating chamber and is connected therewith by means of a conduit 7. The height of the super-saturating chamber above the crystal growth chamber is such that the weight of an aqueous solution in conduit 7 is sufficient to cause the solution to flow downwardly, preferably at a rapid rate. The crystal growth chamber is open to the atmosphere at the top. From a point near the top of the crystal growth chamber a conduit 5 leads to a pump 4 for circulating solution from the top of the crystal growth chamber through conduit 6 back to the super-saturating chamber. The lower end of conduit 7 terminates at a point 8 substantially below the level at which conduit 5 is connected to the crystal growth chamber. Connected to conduit 6 is an inlet 9 for adding a reactant, and connected to conduit 7 is another inlet 10 for adding a reactant. In the aspect of the invention here illustrated, an inlet 11, for adding a feed liquor near the top of the crystal growth chamber, is provided. A salt lock 12 is provided at the bottom of the crystal growth chamber for removing crystals from the chamber. In a preferred embodiment of the invention control means 13 and 14 are provided on inlets 9 and 10, respectively, said control means being responsive to the pH of solution in conduits 6 and 7, respectively, and a heater 15 is also provided on conduit 6.

The arrangement of a super-saturating chamber, crystal growth chamber, pump, and conduits connecting them to form a crystallizing apparatus adapted for continuous operation is already known, being described in Jeremiassen Patent 2,042,661. However such apparatus has not heretofore been applicable to the problem of producing leaded ammonium chloride crystals because such crystals must be formed in an ammoniacal solution, whereas the continuous evaporation cannot be applied to such a solution because it will strip off the ammonia. By the arrangement of inlets in an apparatus of this invention as above described this problem is solved and an apparatus for the continuous crystillization of leaded ammonium chloride in the form of dense, hard crystals is for the first time provided.

In the operation of a process of this invention a quantity of ammonium chloride solution containing dissolved lead chloride in the ratio of 35.6 parts by weight of ammonium chloride to 1 part of lead chloride is introduced into the crystal growth chamber 3 through the inlet 11. It will be understood that in a continuous operation such ammonium chloride solution may be formed continuously if desired by adding gaseous or liquid ammonia and gaseous or liquid hydrogen chloride at various points in the system. The feed liquor preferably is highly concentrated and may, of course, be saturated and may be acidic.

When an adequate volume of solution is in chamber 3 a vacuum is applied to the super-saturating chamber 1, by means of evacuator 2. This draws the solution up conduit 7 and starts the super-saturating process. Circulation of the liquor to the evaporator through conduit 5, pump 4, and conduit 6 is now started, the rate being such as to counterbalance the vacuum effect and permit the solution to run back down conduit 7. In its flow from the top of the crystal growth chamber to the evaporator the solution is acidified with hydrogen chloride to a pH of about from 5 to 7, in the embodiment illustrated in the drawing this being accomplished through inlet means 9 on conduit 6. It will be understood that the acidizing agent may be added together with the feed solution through inlet means 11, or through conduit 5 or the pump 4. The hydrogen chloride may be in gaseous or liquid form or dissolved in water as hydrochloric acid. It is preferred that the solution contain less than about 0.3% free HCl at this point. If desired, the solution may be heated by means of heater 15 as it passes to the super-saturating chamber.

In the super-saturating chamber 1 a vacuum is applied in such a manner as to evaporate sufficient water from the solution to super-saturate it with respect to ammonium chloride. The super-saturated solution immediately passes from the chamber through conduit 7 and the chamber is so constructed that any crystals separating out will be swept from the chamber. The super-saturated solution flows down conduit 7 into the crystal growth chamber. As the solution passes inlet 10 ammonia is added to it, either as gaseous or liquid $NH_3$ or dissolved in the form of ammonium hydroxide, until the solution is ammoniacal. It is preferred that the solution at this point contain about from .03 to 0.3% by weight of free $NH_3$. The rate of flow of the solution through conduit 7 is such that when the solution is discharged at point 8 no ammonium chloride crystals have formed but are formed immediately upon discharge. In the continued operation of the process, part of the ammonium chloride in the super-saturated solution comes out as new crystal nuclei while part adds on to nuclei already present in the crystal growth chamber and results in the growth of such nuclei. These crystals grow in the chamber 3 until they are heavy enough to settle to the bottom of the conical tank, whence they are removed through salt lock 12. The mother liquor flows upwardly, is fortified with feed liquor, and is continuously recirculated through the system.

The level of liquor in the crystal growth chamber may be maintained by a constant level tank, not shown in the drawing. The crystals in the salt lock may be washed by diverting a portion of the effluent liquor from pump 4 back through the lock.

The leaded ammonium chloride crystals produced according to a process of this invention are of novel character. They are hard and dense and hence resistant to crushing and abrasion during handling. This property is particularly advantageous if the crystals are to be used as a galvanizing flux because it reduces the "fines" to a minimum. The crystals contain about from 1 to 5 per cent by weight of lead chloride. They are in the form of substantially regular polyhedrons, in that they are symmetrical in three dimensions, having a sufficiently large number of facets to give a spherical appearance. A majority of the facets, that is, more than half, are quadrilaterals. On the more perfectly formed crystals the facets are diamond-shaped, and number about 24.

The practice of this invention will be better understood by reference to the following illustrative example.

*Example*

An aqueous solution containing 35.6% ammonium chloride and 1% lead chloride, $PbCl_2$, heated to a temperature of 70° C. was fed into the crystal growth chamber of an apparatus illustrated in the drawing. By means of a steam ejector vacuum pump the pressure in the super-saturating chamber was reduced to 4.2 inches of mercury, absolute. This caused the solution to rise in conduit 7 and to partially fill the super-saturating chamber. Circulation of the liquor was then started to the super-saturating chamber through conduit 6 at the rate of 21,028.6 pounds per hour by means of pump 4. Under these conditions water was evaporated from the solution at the rate of 28.6 pounds per hour and there was a downward circulation of liquor from the super-saturating chamber at the rate of 21,000 pounds per hour.

The solution leaving the super-saturating chamber was made ammoniacal by adding gaseous ammonia through the inlet 10 at the rate of 7.68 pounds per hour. Conduit 7 was a 3-inch pipe, and the rate of downward flow of solution was 1.77 feet per second.

Solution was recirculated from near the top of the crystal growth chamber through conduit 5 at the rate of 21,012.1 pounds per hour and through inlet 9 there was added 16.5 pounds per hour of HCl in the form of gaseous hydrogen chloride. This gave the solution a pH of about from 5.0 to 5.5. Feed solution was added through conduit 11 at the rate of 44.42 pounds per hour of an aqueous solution containing 35.6% $NH_4Cl$ and 1% $PbCl_2$, the feed being at 70° C.

Hard, dense crystals of leaded ammonium chloride were withdrawn from the bottom of the crystal growth chamber at the rate of 40 pounds per hour through salt lock 12. These crystals were multi-faceted, the number of facets being sufficiently large to give the crystals a spherical appearance. The crystals were in the form of polyhedrons of substantially regular shape, having symmetry in all three dimensions, and had about twenty-four diamond-shaped facets. The crystals were substantially uniform in size and ideally adapted for use as a galvanizing flux.

In the operation of the process yield losses were negligible.

I claim:

In a process for the manufacture of hard, dense leaded ammonium chloride crystals continuously circulating an aqueous solution substantially saturated with ammonium chloride, containing lead chloride, and acidified with hydrogen chloride to a pH of about from 5 to 7 to a vaporization zone, evaporating water under vacuum from the solution in the vaporization zone until the solution is super-saturated with ammonium chloride, adding ammonia to the solution until it is ammoniacal while the solution is flowing from said vaporization zone to a crystallizing zone, crystallizing leaded ammonium chloride crystals from the solution in said crystallization zone, separating the crystals gravitationally from the mother liquor, adding lead chloride, ammonia, and hydrogen chloride to the separated mother liquor, and recirculating the so-fortified mother liquor to the initial step of the process.

CARL V. HERRMANN.

REFERENCES CITED

The following references are of record in the file of this patent:

UNITED STATES PATENTS

| Number | Name | Date |
| --- | --- | --- |
| 1,879,445 | Othmer | Sept. 27, 1932 |
| 1,936,811 | Weise | Nov. 28, 1933 |
| 2,042,661 | Jeremiassen | June 2, 1936 |
| 2,133,513 | Hirschkind | Oct. 18, 1938 |
| 2,164,112 | Jeremiassen | June 27, 1939 |
| 2,409,790 | Otto | Oct. 22, 1946 |

OTHER REFERENCES

Mellor: Comprehensive Treatise on Inorganic and Theoretical Chemistry, vol 2, page 564, lines 1-9.

Wyckoff: "The Structure of Crystals," Chemical Catalog Co., 1924, pages 209-211.